(12) United States Patent
Kitzmiller

(10) Patent No.: US 11,847,293 B2
(45) Date of Patent: Dec. 19, 2023

(54) SELECTABLE INPUT ALTERATIONS

(71) Applicant: Rolland & Hamann Innovations, LLC, Minneapolis, MN (US)

(72) Inventor: Cortnie Kitzmiller, Minneapolis, MN (US)

(73) Assignee: Rolland & Hamann Innovations, LLC, Minneapolis, MN (US)

( * ) Notice: Subject to any disclaimer, the term of this patent is extended or adjusted under 35 U.S.C. 154(b) by 0 days.

(21) Appl. No.: 17/394,775

(22) Filed: Aug. 5, 2021

(65) Prior Publication Data

US 2023/0040481 A1    Feb. 9, 2023

(51) Int. Cl.
*G06F 3/0481* (2022.01)
*G06F 3/04817* (2022.01)
*G06F 3/04842* (2022.01)
*G06F 3/04886* (2022.01)
*G06F 3/0488* (2022.01)

(52) U.S. Cl.
CPC ........ *G06F 3/0481* (2013.01); *G06F 3/04817* (2013.01); *G06F 3/0488* (2013.01); *G06F 3/04842* (2013.01); *G06F 3/04886* (2013.01)

(58) Field of Classification Search
CPC .... G06F 3/0481; G06F 3/0482; G06F 3/0484; G06F 3/04817; G06F 3/04842; G06F 3/0488; G06F 3/04886
See application file for complete search history.

(56) References Cited

U.S. PATENT DOCUMENTS

| | | | | |
|---|---|---|---|---|
| 2007/0262965 A1* | 11/2007 | Hirai | ............... | B60R 11/0235 345/173 |
| 2009/0167682 A1* | 7/2009 | Yamashita | ............ | G06F 3/011 345/158 |
| 2011/0050619 A1* | 3/2011 | Griffin | ............... | G06F 3/044 345/174 |
| 2011/0057907 A1* | 3/2011 | Kim | ............... | G06F 3/04817 715/702 |
| 2012/0032979 A1* | 2/2012 | Blow | ............... | G06F 1/1626 345/173 |
| 2013/0019192 A1* | 1/2013 | Itoh | ............... | G06F 3/048 345/173 |
| 2013/0326376 A1* | 12/2013 | Stachniak | ............ | A63F 13/50 715/762 |
| 2015/0089386 A1* | 3/2015 | Brisebois | ............ | G06F 3/04817 715/746 |
| 2016/0162149 A1* | 6/2016 | Lee | ............... | G06F 3/04886 715/835 |

(Continued)

*Primary Examiner* — Tuyetlien T Tran
(74) *Attorney, Agent, or Firm* — Brooks, Cameron & Huebsch, PLLC

(57) ABSTRACT

In some examples, the disclosure describes a non-transitory memory resource storing machine-readable instructions stored thereon that, when executed, cause the processor resource to: identify a plurality of selectable input objects displayed on a user interface, determine a portion of the plurality of selectable input objects covered by a palm portion of a hand for a first designated hand orientation when the portion of the selectable inputs are selected by a finger, and alter a position of the determined portion of the plurality of selectable inputs to an inverse position, wherein the inverse position positions the portion of the plurality of selectable input objects to be covered by a palm portion of a hand for a second designated hand orientation.

18 Claims, 5 Drawing Sheets

(56) References Cited

U.S. PATENT DOCUMENTS

2016/0179338 A1* 6/2016 Miller .................... G06F 3/017
 345/174
2017/0153813 A1* 6/2017 Hao .................... G06F 3/04842

\* cited by examiner

SELECTABLE INPUT ALTERATIONS

BACKGROUND

An electronic device can include a computing device that can perform computing functions. In some examples, the computing device can be coupled to a display device. In some examples, computing device can be a mobile computing device such as a smartphone that includes a touchscreen display to allow a user to interact with the computing device.

DETAILED DESCRIPTION

Figure 1:
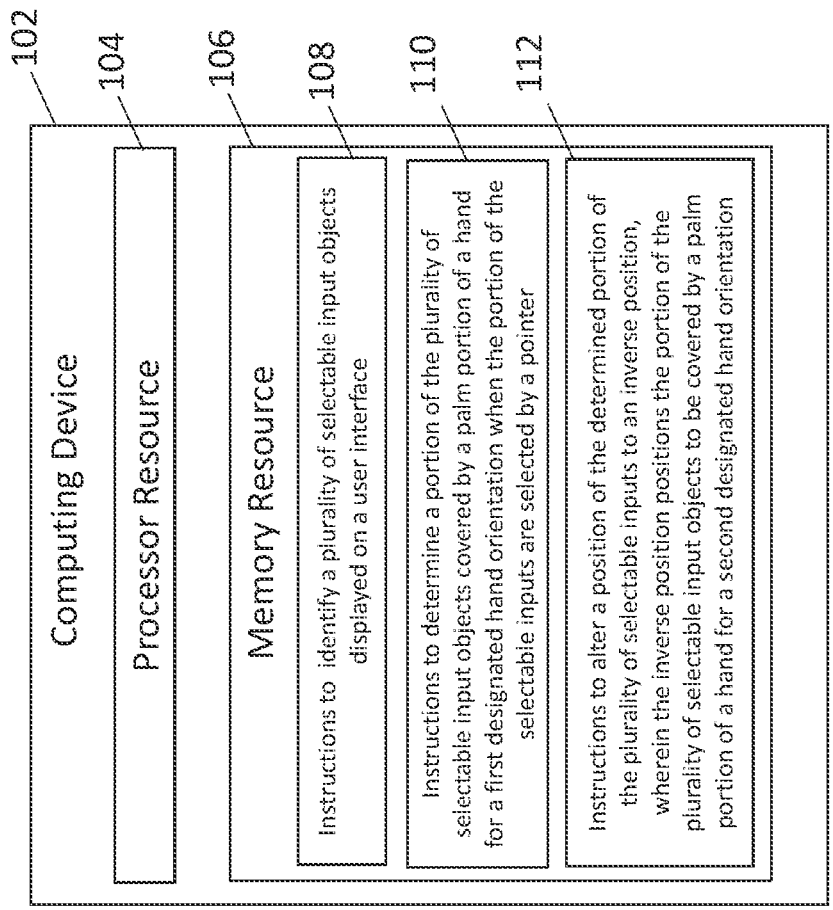
FIG. 1 illustrates an example of a computing device for selectable input alterations.

A user may utilize a computing device for various purposes, such as for business and/or recreational use. As used herein, the term computing device refers to an electronic system having a processor resource and a memory resource. Examples of computing devices can include, for instance, a laptop computer, a notebook computer, a desktop computer, controller, and/or a mobile device (e.g., a smart phone, tablet, personal digital assistant, etc.), among other types of computing devices.

Electronic devices such as computing devices can be utilized for displaying images, receiving inputs, and responding to the received inputs. In some examples, the computing devices can be mobile computing devices such as smartphones that can include an enclosure that protects the processor and memory resource of the computing device and secure the display device. In these examples, the display device can be a hand held device where the user can operate the computing device by holding the computing device in one hand and utilize the other hand to select selectable inputs on the display device. In these examples, the hand holding or positioning the computing device can be a left hand and the hand holding a pointer or using a finger to select selectable inputs displayed on the display device can be the right hand. In these examples, the user can be a right hand dominant user. In these examples, the application being operated by the computing device can be programmed to be operated by a right hand dominant user. However, a portion of the population can be left hand dominant and utilize a right hand to hold the computing device and the left hand to select the selectable inputs displayed on the display device. In this way, the orientation of the selectable inputs positioned on the display device can be more easily operated by the right hand dominant user than the left hand dominant user.

The present disclosure relates to altering the position of selectable inputs based on a dominant hand selection, and/or based on a holding hand and selection hand selection. In this way, a user can alter the positions of the selectable inputs of an application from a first position on the display device to a second position on the display device. In some examples, the first position and the second position can be opposite of a centerline of the display device. In this way, the first position can be an original position that can be designed for a first type of user (e.g., right hand dominant user, user that utilizes a right hand to make selections, etc.) while the second position can be an alternated position that can be designed for a second type of user (e.g., left hand dominant user, user that utilizes a left hand to make selections, etc.).

The present disclosure can alter the location or position of the selectable inputs on the display device when a user is utilizing a finger to make selections and a palm of the user is covering a portion of the display device that is displaying images or data that may be of interest to the user. For example, the palm of a right hand dominant user can cover a bottom right portion of the display device when the user is utilizing a finger of the right hand to make a selection on the left side of the display device. In these examples, images or data positioned below the palm of the user can be needed information while the user is selecting the selectable input on the left side of the display device. In these examples, the selectable inputs on the left side of the display can be altered to a right side of the display to lower the area of the display device that is beneath the palm of the user when selecting the selectable input.

FIG. 1 illustrates an example of a computing device 102 for selectable input alterations. In some examples, the computing device 102 can be a portable computing device such that a user can hold the computing device 102 and display device. In some examples, the computing device 102 can include an enclosure that includes a display device such that the user can hold the computing device 102 with a first hand and make selections with a second hand. As described further herein, the orientation or position of selectable inputs displayed on the display device can be covered when a user is making a selection. In order to provide important information to a user during a selection, the position or orientation of the selectable inputs can be orientated based on a selection hand.

As used herein, a selectable input can be an image that is displayed on a display device at a location that when the location is selected, a particular response is performed by the computing device 102. For example, the selectable input can be an icon that is displayed at a particular location on the display device. When the display device is a touch screen display, a user touching or making contact with the location of the icon a particular function corresponding to the icon can be performed. In some examples, the display device coupled to the computing device 102 can display a plurality of icons or selectable inputs associated with a particular application or set of instructions. In some examples, the application can be a mobile computing game associated with the computing device 102.

The computing device 102 can include components such as a processor resource 104. As used herein, the processor resource 104 can include, but is not limited to: a central processing unit (CPU), an application specific integrated circuit (ASIC), a field programmable gate array (FPGA), a metal-programmable cell array (MPGA), a semiconductor-based microprocessor, or other combination of circuitry and/or logic to orchestrate execution of instructions 108, 110, 112, In other examples, the computing device 102 can include instructions 108, 110, 112, stored on a machine-readable medium (e.g., memory resource 106, non-transitory computer-readable medium, etc.) and executable by a processor resource 104. In a specific example, the computing device 102 utilizes a non-transitory computer-readable medium storing instructions 108, 110, 112, that, when executed, cause the processor resource 104 to perform corresponding functions.

In some examples, the computing device 102 can include instructions 108 to identify a plurality of selectable input objects displayed on a user interface. As used herein, a user interface can be images displayed on a display device to allow a user to interact with the computing device. For example, the user interface can include an Android interface or similar interface that can allow a user to utilize a plurality of applications and/or instruct the computing device 102 to perform particular functions. As described herein, the plurality of selectable input objects can be icons or images that are displayed at a plurality of locations on the display device. As described herein, the plurality of selectable input objects can be selectable through a touch input to instruct the computing device 102 to perform a corresponding function associated with the selected selectable input object.

In some examples, the computing device 102 can include instructions 110 to determine a portion of the plurality of selectable input objects covered by a palm portion of a hand for a first designated hand orientation when the portion of the selectable inputs are selected by a pointer. As used herein, a pointer can include a finger, stylus, or other device that is capable of making a selection of the selectable inputs. In some examples, the portion of the plurality of selectable input objects that would be covered by a palm or are actually covered by a palm can be determined based on a selected hand orientation of the user and/or through a test mode. In one example, a user can select a particular hand orientation for the user. For example, the user can select that they user their right hand to make selections on the user interface or the user can select that they use their left hand to make selections on the user interface. In this example, the area of the palm can be estimated based on the screen size of the display device and a location of the plurality of selectable inputs to determine the portion of the plurality of inputs that are likely to be covered by a user's palm when making a selection of a particular selectable input.

In other examples, a test mode can be initiated to determine a portion of the display device and/or a portion of the plurality of selectable input objects that are covered for a plurality of test locations. In some examples, the test mode can instruct a user to make a selection on the display device at a first location and identify the area that is covered by the palm of the user when making the selection at the first location. This can be performed a plurality of times a plurality of locations around the user interface of the display device to determine selectable inputs that will be covered by the palm of the user for different selections of a particular application. In this way, the selectable input objects can be altered based on the area covered by the palm of the user when selecting particular selectable input objects.

In some examples, the computing device 102 can include instructions 112 to alter a position of the determined portion of the plurality of selectable inputs to an inverse position, wherein the inverse position positions the portion of the plurality of selectable input objects to be covered by a palm portion of a hand for a second designated hand orientation. As described herein, the first designated hand orientation can be a right hand dominant hand orientation or a left hand dominant orientation. In some examples, the second designated hand orientation can be the opposite hand orientation as the first designated hand orientation. That is, the second designated hand orientation can be left hand dominant when the first designated hand orientation is right hand dominant.

In some examples, the portion of the plurality of selectable input objects can be positioned at an inverse position of a centerline of the display device when the palm of the user is covering the portion of the plurality of selectable input objects during a selection of a particular selectable input object. In these examples, the computing device 102 can determine whether the portion of the plurality of selectable input objects are important or may need to be viewable by the user when the user is selecting the particular selectable input object. For example, the information or ability to select the portion of the plurality of selectable input objects can be needed to more effectively utilize the user interface. In a specific example, the user interface can be displaying a game that instructs the user to make the particular selection of a particular selectable input object. In some examples, during the selection an additional instruction to select a different selectable input object can be presented at a particular location on the user interface. If the additional instruction is positioned at a location that would be covered by the user's palm, the information may not be received by the user until after the particular selection is performed, which can delay the user's ability to select the different selectable input object within a particular period of time. In this way, the computing device 102 can determine that the position of the particular selectable input object may be moved to a location where the instruction is not covered by the user's palm when making the particular selection of the particular selectable input object.

In some examples, the computing device 102 can include instructions to inverse the position of the plurality of selectable inputs based on a determined center of the user interface. In some examples, the determination that a portion of the selectable input objects are displayed at a location that would be covered by a user's palm can result in altering the position of the plurality of selectable input objects to be inversed on the display device. In some examples, inversing the position of the plurality of selectable inputs can include determining a center line of the display device. In some examples, the center line can be a center position between a right side of the display a left side of the display based on orientation (e.g., portrait orientation of the mobile device, landscape orientation of the mobile device, etc.). For example, the display device can be in a portrait orientation when the display device is positioned toward a user such that the height of the device or image is greater than a width of the device or image. In this example, the display device can be rotated such that width is greater than the height when viewed from the perspective of the user. Thus, in some examples, the center line can be utilized to identify a right side of the display and a left side of the display from the perspective of the user for a plurality of orientations of the display device.

In some examples, the computing device 102 can include instructions to determine a portion of the plurality of selectable inputs that would be covered by a palm portion of a hand for a second designated hand orientation. As described herein, the computing device 102 can identify the portion of the plurality of selectable input objects or inputs that would be covered by the palm of user when selecting particular selectable inputs displayed on the display device for the first designated hand orientation and the second designated hand orientation.

In some examples, the computing device 102 can include instructions to divide the user interface into a first portion and a second portion and inversely position the selectable inputs from the first portion into the second portion and inversely position the selectable inputs from the second portion into the first portion. In these examples, the first portion and the second portion can be divided by a center line of the display device. In some examples, the relative position of a selectable input object within the first portion can be moved to a corresponding and inverse location within the second portion. In a similar way, a selectable input within the second portion can be moved to a location within the first portion that is inverse to the relative position of the selectable input within the second portion. In this way, the plurality of selectable inputs can be altered based on the centerline and be moved to a location that may not be covered by a user's palm while making particular selections.

In some examples, the computing device 102 can include instructions to identify a designated hand orientation for an application that includes the plurality of selectable inputs. As described herein, the hand orientation can be selected manually by a user by indicating the hand a user utilizes to make selections on the display device. In a different example, a test mode can be utilized to identify how a user's palm may cover objects or selectable inputs being displayed on the user interface during different selections. In some examples, the user may utilize a first hand for particular selections and the other hand for other selections. In this way, the test mode can identify the selection hand for a plurality of different selections.

In some examples, the computing device 102 can include instructions to identify a position for the plurality of selectable inputs based on a selected hand orientation and the designated hand orientation for the application. In some examples, an application can include a designated hand orientation. As used herein, a designated hand orientation can be the hand orientation utilized by the application developer. Most applications today are developed with the intention of a right hand dominant user utilizing the application. Thus, many applications utilize a designated hand orientation of right hand dominant.

In some examples, the computing device 102 can include instructions to alter a position of the plurality of selectable inputs for an application based on a selected designated hand orientation. As described herein, if the application includes a right hand designated hand orientation and the selected hand orientation for a particular user is left hand, the plurality of selectable inputs can be altered inversely as described here. In other examples, the test mode of the user interface can be compared to the location of the selectable inputs to identify whether the plurality of selectable inputs will be covered during selections or if a current position of the plurality of selectable inputs will be better than an inverse position.

Figure 2:
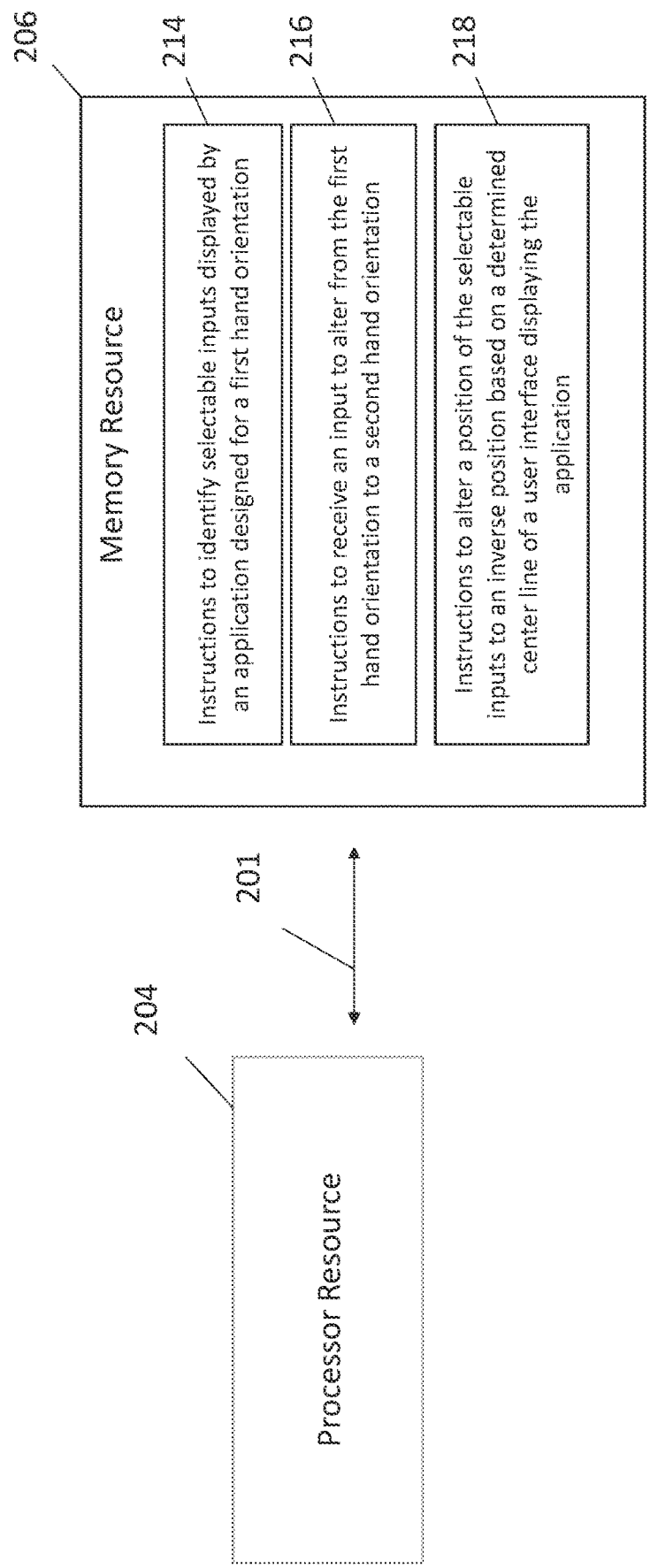
FIG. 2 illustrates an example of a memory resource for selectable input alterations.

FIG. 2 illustrates an example of a memory resource for selectable input alterations. In some examples, the memory resource 206 can be a part of a computing device or controller that can be communicatively coupled to a system (e.g., system 100 as referenced in FIG. 1, etc.). For example, the memory resource 206 can be part of a computing device 102 as referenced in FIG. 1. In some examples, the memory resource 206 can be communicatively coupled to a processor resource 204 that can execute instructions 214, 216, 218 stored on the memory resource 206. For example, the memory resource 206 can be communicatively coupled to the processor resource 204 through a communication path 201. In some examples, a communication path 201 can include a wired or wireless connection that can allow communication between devices and/or components within a device or system.

The memory resource 206 may be electronic, magnetic, optical, or other physical storage device that stores executable instructions. Thus, a non-transitory machine readable medium (MRM) (e.g., a memory resource 206) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine readable medium (e.g., a memory resource 206) may be disposed within a controller and/or computing device. In this example, the executable instructions 214, 216, 218 can be "installed" on the device. Additionally, and/or alternatively, the non-transitory machine readable medium (e.g., a memory resource) can be a portable, external or remote storage medium, for example, that allows a computing system to download the instructions 214, 216, 218 from the portable/external/remote storage medium. In this situation, the executable instructions may be part of an "installation package". As described herein, the non-transitory machine readable medium (e.g., a memory resource 206) can be encoded with executable instructions for performing calculations or computing processes.

The instructions 214, when executed by a processor resource such as the processor resource 204, can include instructions to identify selectable inputs displayed by an application designed for a first hand orientation. In some examples, the first hand orientation is a programmed hand orientation for the application. As described herein, a hand orientation can identify a hand that a user utilizes to make selections on a touch screen display device. In some examples, the first hand orientation can be the hand orientation selected by a programmer when developing the application. In some examples, the hand orientation may not be specified by the manufacturer and may not be obvious which or whether any true hand orientation is utilized. In these examples, the first hand orientation can be the manufacturer hand orientation or an original orientation utilized by the application when it is first accessed by a user or first displayed by the display device.

The instructions 216, when executed by a processor resource such as the processor resource 204, can include instructions to receive an input to alter from the first hand orientation to a second hand orientation. In some examples, the input to alter from the first hand orientation to the second hand orientation can be a selection from a user from the first hand orientation to the second hand orientation. In other examples, a test mode can be performed by the user and a determination can be made that the second hand orientation would be advantageous for the user to utilize over the first hand orientation since fewer object will be covered by a palm of the user when selecting particular selectable inputs associated with the application.

In these examples, the frequency of use for particular selectable inputs can be utilized to prioritize the palm location for the user when selecting the particular selectable inputs. That is, a first selectable input can be prioritized and given more weight over a second selectable input that is not utilized during operation of the application compared to the first selectable inputs. In this example, the palm position of the user when selecting the first selectable input can be utilized to identify whether the first and orientation or the second hand orientation should be selected for the user. Thus, the orientation of the application can be based on a palm position of the user when selecting a particular selectable input since the particular selectable input may be selected more frequently when using the application compared to other selectable inputs.

The instructions 218, when executed by a processor resource such as the processor resource 204, can include instructions to alter a position of the selectable inputs to an inverse position based on a determined center line of a user interface displaying the application. As described herein, the determined center line of the user interface can be based on a device orientation or display orientation of the device such that the display is split into a first portion and a second portion. As described herein, the first portion can be a right side of the display and the second portion can be the left side of the display. In these examples, the location of the plurality of selectable inputs can be identified on the first side and shifted inversely to the second side and the plurality of selectable inputs can be identified on the second side and shifted inversely to the first side.

In some examples, the memory resource 206 can include instructions that can be executed by the processor resource 204 to dynamically alter identified selectable inputs displayed by the application to an inverse position on the user interface. In some examples, the selectable inputs can be dynamically altered during execution of the application. In this way, the application may not have to be altered to provide the altered viewing position of the plurality of selectable inputs. In addition, the instructions of the memory resource 206 can be utilized to alter selectable inputs for a plurality of different applications by identifying the selectable inputs of the plurality of different applications.

In some examples, the memory resource 206 can include instructions that can be executed by the processor resource 204 to identify non-selectable images within the area of the display and alter a position of the non-selectable images based on the altered position of the selectable inputs. In some examples, the user interface of the application can include objects that are selectable and objects that are not selectable. In this way, the instructions can identify the portions of the display that include selectable objects and non-selectable images. In some examples, altering the location of the selectable objects can misalign the non-selectable objects without also altering the position of the non-selectable objects. Thus, the non-selectable objects can be altered based on the altered position of the selectable objects.

In some examples, the memory resource 206 can include instructions that can be executed by the processor resource 204 to determine the center line of the display based on an orientation of the display. As described herein, the center line of the display device can be based on the orientation of the device such that that an imaginary vertical line from a top of the device to the bottom of the device can be determined for a center position of the device. In this way, the objects that are displayed can be inversely positioned relative to the center line of the device.

In some examples, the memory resource 206 can include instructions that can be executed by the processor resource 204 to identify an area with a plurality of selectable inputs and inverse the area that includes the plurality of selectable inputs. In some examples, the plurality of selectable inputs can be organized within a particular area or section. In some examples, the entire area or section that includes the plurality of selectable inputs can be moved from a first position to a second position such that the altered position is an inversed position from the original position.

In some examples, the memory resource 206 can include instructions that can be executed by the processor resource 204 to divide a user interface into a plurality of portions, identify selectable inputs within the plurality of portions, and inverse a position of the plurality of portions that include identified selectable inputs. As described herein, the instructions can divide the user interface into a plurality of portions. In these examples, the user interface can be split into four quarters and the plurality of selectable inputs can be identify as being within a first portion and moved to a second portion based on the location of the selectable inputs within the first portion.

Figure 3:
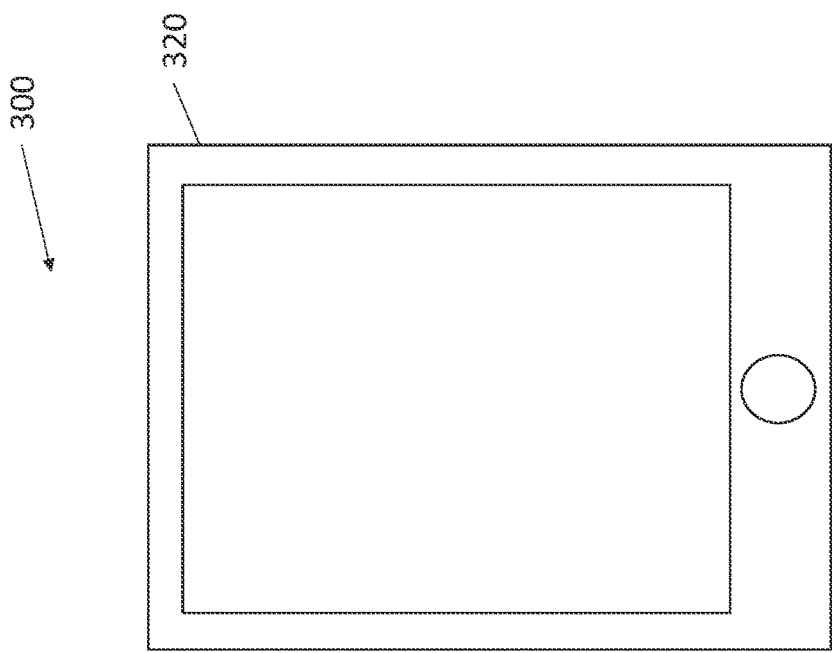
FIG. 3 illustrates an example of a system that includes a computing device for selectable input alterations.
Figure 3:
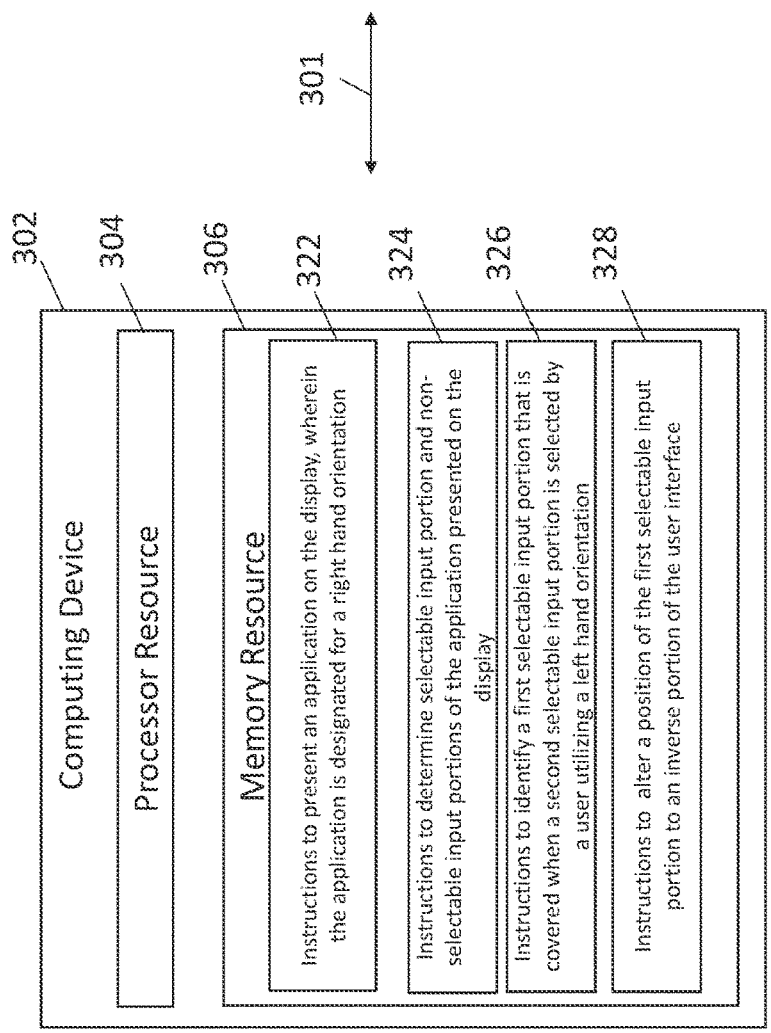

FIG. 3 illustrates an example of a system 300 that includes a computing device for selectable input alterations. In some examples, the computing device 302 can be a device that includes a processor resource 304 communicatively coupled to a memory resource 306. As described herein, the memory resource 306 can include or store instructions 322, 324, 326, 328, that can be executed by the processor resource 304 to perform particular functions. In some examples, the computing device 302 can be communicatively coupled to a display device 320 through a communication path 301. In some examples, the communication path 301 can be a wired or wireless connection to allow signals to be passed between the computing device 302 and the display device 320.

In some examples, the computing device 302 can include instructions 322 that can be executed by a processor resource 304 to present an application on the display device 320, wherein the application is designated for a right hand orientation. In some examples, the application can be a game that includes a visual user interface with a portion of the user interface having selectable inputs a portion of the user interface having non-selectable inputs. In some examples, the selectable inputs and/or the non-selectable inputs can be orientated or positioned for a right hand user or positioned in a right hand orientation to allow an individual to more easily select the selectable inputs and/or read or visualize the non-selectable inputs. In this way, a left hand user or user that utilizes the left hand to make selections may find it more difficult to make the same selections. In other examples, a user that utilizes a first hand to make a portion of the selections and a second hand to make other selections may also find it more difficult to make selections than a right hand dominant user.

In some examples, the computing device 302 can include instructions 324 that can be executed by a processor resource 304 to determine selectable input portion and non-selectable input portions of the application presented on the display. As described herein, the selectable input portion can include a plurality of selectable inputs that can be moved relative to the non-selectable input portions. In some examples, the non-selectable input portions can be identified as background portions and maintain a particular position within the user interface.

In some examples, the computing device 302 can include instructions 326 that can be executed by a processor resource 304 to identify a first selectable input portion that is covered when a second selectable input portion is selected by a user utilizing a left hand orientation. In some examples, the first selectable input portion is not covered by a user utilizing the right hand orientation. As described herein, the application can be designed for a user to utilize the right hand orientation. When a user is utilizing the left hand orientation, a palm of the user can cover the first selectable input where a different user utilizing the right hand orientation may not cover the first selectable input. For example, the second selectable input can be positioned on a right side of the display device. In this example, a user utilizing the right hand orientation (e.g., making selections with their right hand or pointer in their right hand, etc.) may be able to make the selection of the second selectable input without covering the first selectable input. However, when a user utilizing the left hand orientation (e.g., utilizing their left hand to make selections, etc.) may cover the first selectable input with their palm when selecting the second selectable input on the right side of the display device.

In some examples, the computing device 302 can include instructions 328 that can be executed by a processor resource 304 to alter a position of the first selectable input portion to an inverse portion of the user interface. As described herein, the first selectable input can be positioned not to be covered when a user using the right hand orientation is interacting the with the second selectable input. However, since a user utilizing the left hand orientation does cover the first selectable input, the first selectable input can be moved to an inverse location to allow the user utilizing the left hand orientation to select the second selectable input and still view the first selectable input. This can also be utilized to move non-selectable inputs in a similar way based on the portion of the display that would normally be covered by a right hand orientation compared to a left hand orientation.

In some examples, the computing device 302 can include instructions to receive an input that the user interface is to be converted to a left hand orientation. As described herein, the default orientation for a particular application can be a right hand orientation. In other examples, the default orientation can be identified as a default orientation and an altered orientation can be identified as an inverse orientation. In either case, the different orientation can be selected by a user manually or identified during a test mode for the particular application. As described herein, the test mode can be utilized to determine a palm position for selections made a particular locations on the display device that can be determined based on the determined locations of the plurality of selectable inputs and/or non-selectable inputs that are intended to notify a user.

In some examples, the computing device 302 can include instructions to alter a position of the non-selectable input portions based on the altered position of the first selectable input portion. As described herein, the non-selectable inputs can be portions of the user interface that are not selectable. However, the non-selectable inputs can provide feedback or instructions to the user. In these cases, the non-selectable inputs can be moved to allow a user to read or be notified by the non-selectable inputs while making selections at particular locations on the user interface.

In some examples, the computing device 302 can include instructions to inversely position the first selectable input portion with the non-selectable input portion that are proximate to the first selectable input portion. In some examples, the non-selectable input portion can be positioned on a first side of the user interface of the display device and the selectable input portion can be positioned on a second side of the user interface. In these examples, the position of the first selectable input portion can be positioned inversely with the non-selectable input portion.

In some examples, the computing device 302 can include instructions to alter the first selectable input portion and maintain a position and maintain the non-selectable input portion. As described herein, the non-selectable input portion can be a background or image that would not allow the non-selectable input portion to be moved or inversely moved without distorting the image. In this way, the non-selectable input portions can remain at an original location when the selectable input portions or moved or inversely moved.

Figure 4:
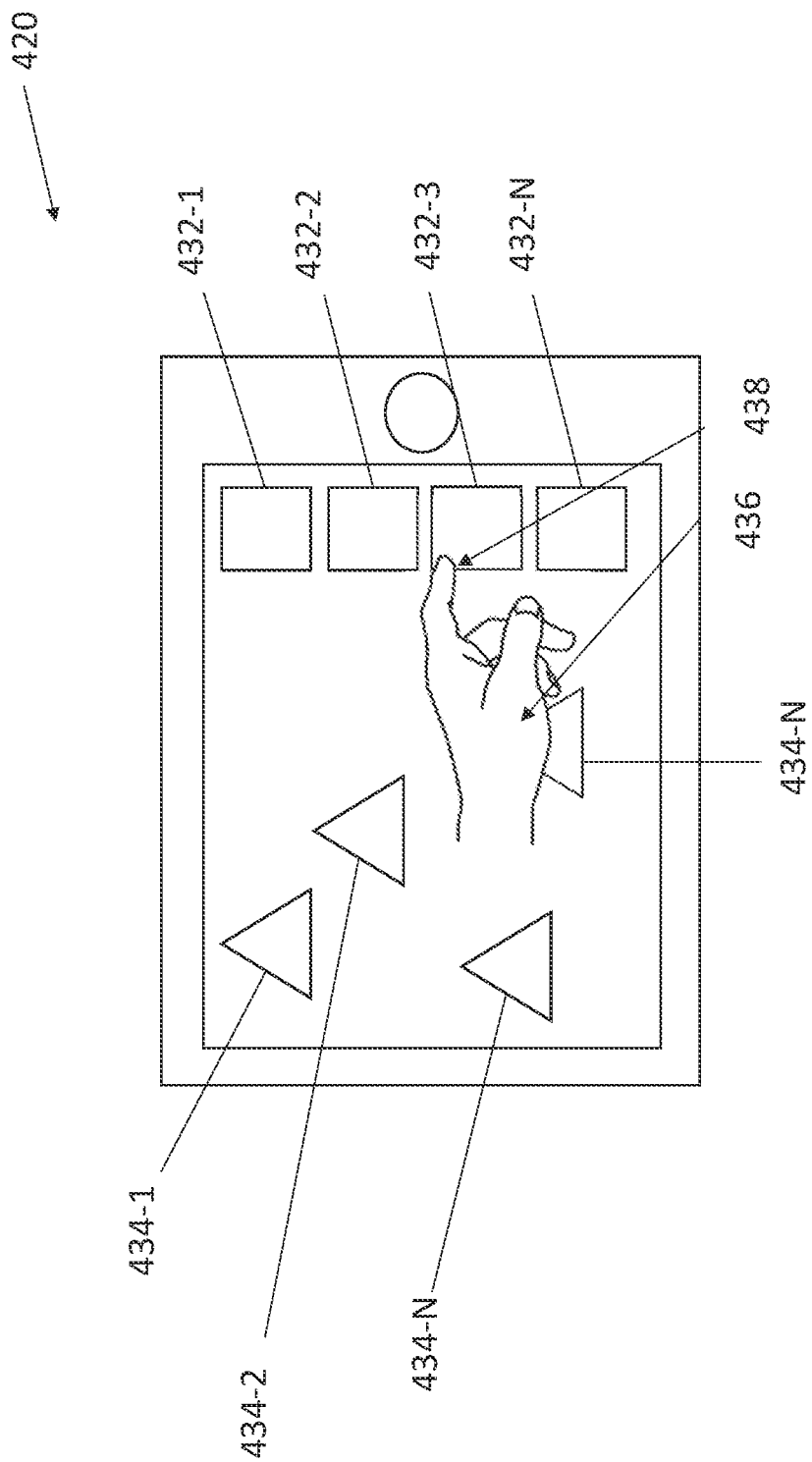
FIG. 4 illustrates an example of a display device for selectable input alterations.

FIG. 4 illustrates an example of a display device 420 for selectable input alterations. The display device 420 can be a smart phone, tablet, or other type of touch screen device. As described herein, a touch screen device can receive inputs through touching the surface of the display device 420. In some examples, the display device 420 can include a computing device that includes instructions to perform functions as described herein.

In some examples, the display device 420 can display a user interface that includes a plurality of selectable inputs 432-1, 432-2, 432-3, 432-N positioned on a first side of the display device 420 (e.g., right side as illustrated in FIG. 4) and a plurality of non-selectable inputs 434-1, 434-2, 434-3, 434-N. In some examples, the plurality of selectable inputs 432-1, 432-2, 432-3, 432-N can be images or icons that can be selected by a user to instruct the computing device associated with the display device 420 to perform a particular function. In some examples, the plurality of non-selectable inputs 434-1, 434-2, 434-3, 434-N can be altered in response to the selections of the plurality of selectable inputs 432-1, 432-2, 432-3, 432-N. For example, the plurality of non-selectable inputs 434-1, 434-2, 434-3, 434-N can change in shape, color, and/or location based on the selections of the plurality of selectable inputs 432-1, 432-2, 432-3, 432-N. In this way, a user may want to view the plurality of non-selectable inputs 434-1, 434-2, 434-3, 434-N while making a selection of one or more of plurality of selectable inputs 432-1, 432-2, 432-3, 432-N.

In some examples, the user interface of the display device 420 can be orientated for a right hand user. For example, the plurality of selectable inputs 432-1, 432-2, 432-3, 432-N can be positioned on a right side of the display device 420 to allow a right hand user to select one or more of the plurality of selectable inputs 432-1, 432-2, 432-3, 432-N without covering one or more of the plurality of non-selectable inputs 434-1, 434-2, 434-3, 434-N. However, as illustrated in FIG. 4, a left hand oriented user can block or cover the non-selectable input 434-3 with the user's palm 436 when selecting the selectable input 432-3 with the user's finger 438.

In these examples, the display device 420 can alter the position of the plurality of selectable inputs 432-1, 432-2, 432-3, 432-N and/or the plurality of non-selectable inputs 434-1, 434-2, 434-3, 434-N, as described herein. In some examples, the position of the user's palm 436 when selecting the non-selectable input 434-3 can be utilized to determine a different location for the plurality of selectable inputs 432-1, 432-2, 432-3, 432-N and/or the plurality of non-selectable inputs 434-1, 434-2, 434-3, 434-N. In other examples, the inverse location of the plurality of selectable inputs 432-1, 432-2, 432-3, 432-N and/or the plurality of non-selectable inputs 434-1, 434-2, 434-3, 434-N can be utilized. The altered location for the plurality of selectable inputs 432-1, 432-2, 432-3, 432-N and/or the plurality of non-selectable inputs 434-1, 434-2, 434-3, 434-N are illustrated in FIG. 5.

Figure 5:
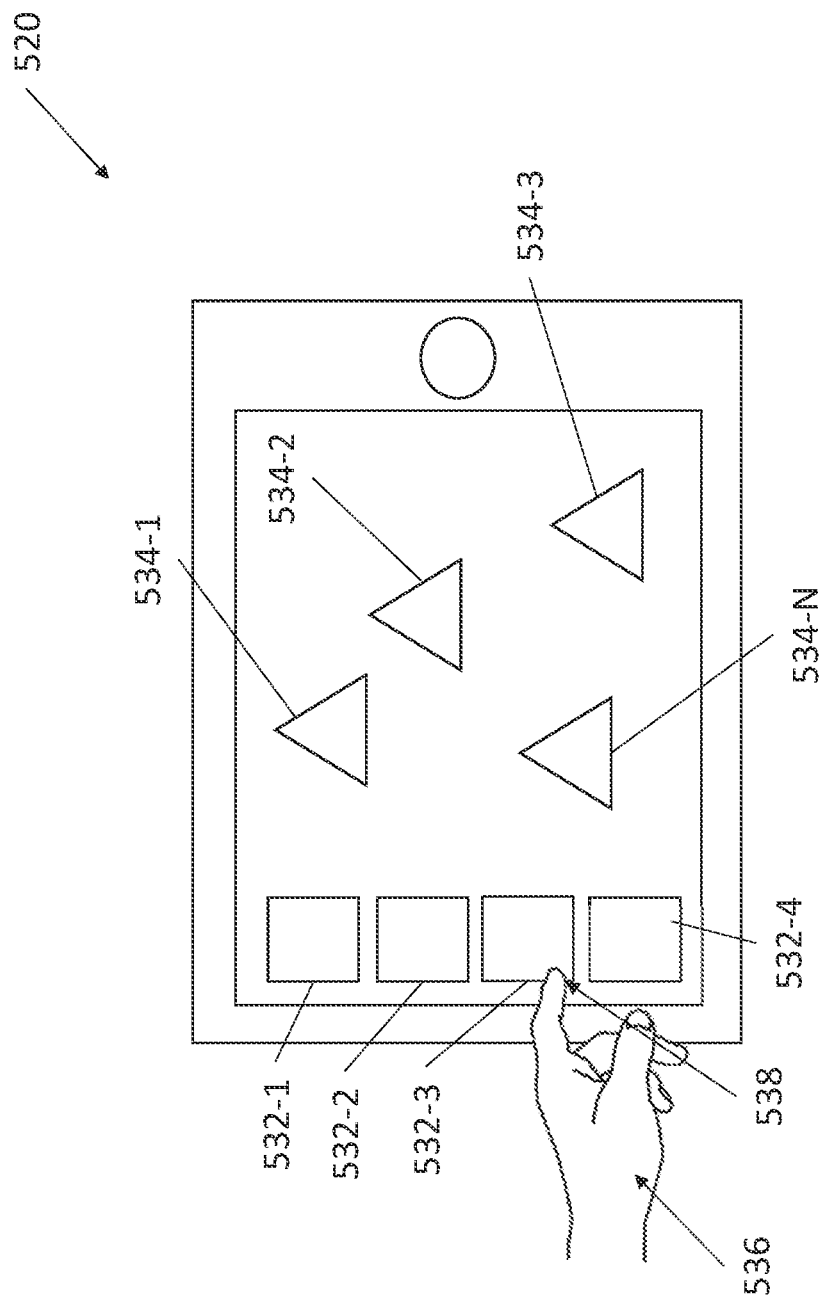
FIG. 5 illustrates an example of a display device for selectable input alterations.

FIG. 5 illustrates an example of a display device 520 for selectable input alterations. As described herein, the display device 520 can be the same as display device 420 as illustrated in FIG. 4 with altered positions of the plurality of selectable inputs 532-1, 532-2, 532-3, 532-N and/or the plurality of non-selectable inputs 534-1, 534-2, 534-3, 534-N. As illustrated in FIG. 5, the plurality of selectable inputs 532-1, 532-2, 532-3, 532-N have been inversely altered from the right side of the display device 520 to the left side of the display device 520. In addition, the plurality of non-selectable inputs 534-1, 534-2, 534-3, 534-N have been altered from the left side of the display device 520 to the right side of the display device.

As illustrated in FIG. 5, the selection of the selectable input 532-3 allows the user's finger 538 to make the selection without the user's palm 536 covering one or more of the plurality of non-selectable inputs 534-1, 534-2, 534-3, 534-N. In this way, the user can more easily view the plurality of non-selectable inputs 534-1, 534-2, 534-3, 534-N while making selections of the plurality of selectable inputs 532-1, 532-2, 532-3, 532-N. In some examples, a background behind the plurality of selectable inputs 532-1, 532-2, 532-3, 532-N and/or the plurality of non-selectable inputs 534-1, 534-2, 534-3, 534-N can remain unchanged such that the background image of the display device is not distorted or altered in a way that may be distracting to the user.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure. Since many examples can be made without departing from the spirit and scope of the system and method of the disclosure, this specification merely sets forth some of the many possible example configurations and implementations.

What is claimed is:

1. A computing device, comprising:
   a processor resource; and
   a non-transitory memory resource storing machine-readable instructions stored thereon that, when executed, cause the processor resource to:
   open a test mode for an application that utilizes a touchscreen user interface;
   identify a plurality of selectable input objects displayed on a user interface;
   identify a plurality of non-selectable input objects displayed on the user interface, wherein a location of the plurality of non-selectable input objects are altered in response to a selection of one or more of the selectable input objects;
   instruct a user to make a first selection on the touchscreen user interface at a first location that corresponds to one of the plurality of selectable input objects;
   identify which of a user's hands is being utilized for the selection;
   identify an area covered by a palm of the user when making the first selection at the first location;
   determine a portion of the plurality of selectable input objects covered by a palm portion of a hand for a first designated hand orientation when the user is making the first selection at the first location;
   alter a position of a determined portion of the plurality of selectable inputs and non-selectable input objects which are covered by the user's palm to an inverse position, where the position of the selectable input objects and non-selectable input objects are inverted across a vertical centerline;
   allow the user to compare the altered position of the selectable input objects, non-selectable input objects with the first location of the selectable inputs, and non-selectable input objects, to identify whether the plurality of selectable input objects or non-selectable input objects will be covered during selections in the altered position;
   activate a non-test mode utilizing the altered positions of the selectable and non-selectable objects.

2. The computing device of claim 1, wherein the altered positions are applicable to the application whose selectable input objects and non-selectable input objects are being tested, and not to other applications of the device not currently being tested.

3. The computing device of claim 1, wherein the processor resource is to identify a designated hand orientation for an application that includes the plurality of selectable inputs.

4. The computing device of claim 3, wherein the processor resource is to identify a position for the plurality of selectable inputs based on a selected hand orientation and the designated hand orientation for the application.

5. The computing device of claim 1, wherein the processor resource is to alter a position of the plurality of selectable inputs for an application based on a selected designated hand orientation.

6. A non-transitory memory resource storing machine-readable instructions stored thereon that, when executed, cause a processor resource to:
   open a test mode for an application that utilizes a touchscreen user interface;
   identify selectable inputs displayed by an application designed for a first hand orientation;
   identify non-selectable input objects displayed by the application, wherein a location of the non-selectable input objects are altered in response to a selection of one or more of the selectable input objects and wherein the non-selectable input objects do not result in an input to the application when selected;
   receive an input to alter from the first hand orientation to a second hand orientation;
   alter a position of the selectable inputs to an inverse position based on a determined center line of a user interface displaying the application;
   alter the location of the non-selectable input objects such that the non-selectable input objects are not blocked by a palm portion of the user's hand for the second hand orientation when the portion of the plurality of selectable inputs are in the inverse position;
   activate a non-test mode utilizing the first hand orientation or the second hand orientation, wherein the altered positions are only applicable to the application.

7. The memory resource of claim 6, wherein the first hand orientation is a programmed hand orientation for the application.

8. The memory resource of claim 6, wherein the processor resource is to dynamically alter identified selectable inputs displayed by the application to an inverse position on the user interface.

9. The memory resource of claim 6, wherein the processor resource is to identify non-selectable images within an area of the display and alter a position of the non-selectable images based on the altered position of the selectable inputs.

10. The memory resource of claim 6, wherein the processor resource is to determine the center line of the display based on an orientation of the display.

11. The memory resource of claim 6, wherein the processor resource is to identify an area with a plurality of selectable inputs and inverse the area that includes the plurality of selectable inputs.

12. The memory resource of claim 6, wherein the processor resource is to:
- divide a user interface into a plurality of portions;
- identify selectable inputs within the plurality of portions; and
- inverse a position of the plurality of portions that include identified selectable inputs.

13. A system, comprising:
- a display to present a user interface; and
- a processor resource to:
  - present an application on the display, wherein the application is designated for a right hand orientation such that non-selectable input objects are not covered by a palm portion of a user when the user is selecting selectable input objects with the user's right hand;
  - determine a selectable input portion that includes the selectable input objects and a non-selectable input portions that include the non-selectable input objects of the application presented on the display, wherein a selection of the selectable input objects result in an input of the application that alters a location of the non-selectable input objects and the non-selectable input objects do not result in an input to the application when selected;
  - open a test mode for an application that utilizes a touchscreen user interface;
  - instruct a user to make a first selection on the touchscreen user interface with a user's left hand at a location that corresponds to one of the selectable input objects;
  - identify an area covered by the palm of the user's left hand when making the first selection at the one of the selectable input objects;
  - determine a portion of the plurality of selectable input objects covered by the palm when selecting the first location;
  - instruct the user to make at least one additional selection on the touch screen user interface at an additional location that corresponds to one of the selectable input objects;
  - determine a frequency of instances in which various selectable inputs and non-selectable objects are covered by the user's palm during the first selection and the additional selection;
  - alter a position of a determined portion of the plurality of selectable input objects and non-selectable objects inputs to an inverse position, where the position of the selectable inputs and non-selectable objects are inverted across a horizontal centerline based on the frequency of instances in which the various selectable inputs and non-selectable objects are covered by the user's palm.
  - allow the user to compare the altered position with an original position of the selectable input objects and non-selectable objects; and
  - activate a non-test mode utilizing the updated positions of the selectable and non-selectable objects.

14. The system of claim 13, wherein the processor resource is to receive an input that the user interface is to be converted to a left hand orientation.

15. The system of claim 13, wherein the first selectable input portion is not covered by a user utilizing a right hand orientation.

16. The system of claim 13, wherein the processor resource is to alter a position of the non-selectable input portions based on the altered position of the first selectable input portion.

17. The system of claim 13, wherein the processor resource is to inversely position the first selectable input portion with the non-selectable input portion that are in contact with the first selectable input portion.

18. The system of claim 13, wherein the processor resource is to alter the first selectable input portion and maintain a position and maintain the non-selectable input portion.

\* \* \* \* \*